US007274859B2

(12) United States Patent
Ohnuma

(10) Patent No.: US 7,274,859 B2
(45) Date of Patent: Sep. 25, 2007

(54) INFORMATION PROCESSING APPARATUS AND METHOD, RECORDING MEDIUM, AND PROGRAM

(75) Inventor: Kensuke Ohnuma, Tokyo (JP)

(73) Assignee: Sony Corporation (JP)

( * ) Notice: Subject to any disclaimer, the term of this patent is extended or adjusted under 35 U.S.C. 154(b) by 1104 days.

(21) Appl. No.: 10/179,690

(22) Filed: Jun. 25, 2002

(65) Prior Publication Data

US 2003/0012549 A1 Jan. 16, 2003

(30) Foreign Application Priority Data

Jun. 28, 2001 (JP) ............................. 2001-195787

(51) Int. Cl.
*H04N 5/91* (2006.01)

(52) U.S. Cl. ........................ 386/95; 386/124; 386/109; 386/46

(58) Field of Classification Search .................. 386/95, 386/109, 124, 46
See application file for complete search history.

(56) References Cited

U.S. PATENT DOCUMENTS 6,441,832 B1 * 8/2002 Tao et al. .................... 715/723
2002/0133820 A1 * 9/2002 Arai et al. ..................... 725/39

FOREIGN PATENT DOCUMENTS

JP 10-162552 6/1998
JP 10-307741 A 11/1998
JP 11-146321 A 5/1999
JP 11-146322 A 5/1999
JP 11-187324 7/1999
JP 11-261954 A 9/1999
JP 20000-013682 A 1/2000
JP 2000-112763 A 4/2000
JP 2001-111921 A 4/2001
JP 2001-147941 A 5/2001
JP 2001-160003 A 6/2001
WO WO 01/28236 A1 4/2001

* cited by examiner

*Primary Examiner*—Thai Q. Tran
*Assistant Examiner*—Helen Shibru
(74) *Attorney, Agent, or Firm*—Lerner, David, Littenberg, Krumholz & Mentlik, LLP

(57) ABSTRACT

In an information processing apparatus, while broadcast content is secondarily used, an advertising video can be certainly viewed. Broadcast reception recorders receive broadcast content broadcast by a broadcasting apparatus and record it in built-in hard disk drives. A user of the broadcast reception recorders edits the received broadcast content, and registers meta-data corresponding to the edits in a video database of a server through a network. A user of the broadcast reception recorders receives the meta-data registered by the other user from the server through the network, and reproduces the broadcast content on the basis of the meta-data. An advertising video is added to the meta-data transmitted from the video database.

7 Claims, 14 Drawing Sheets

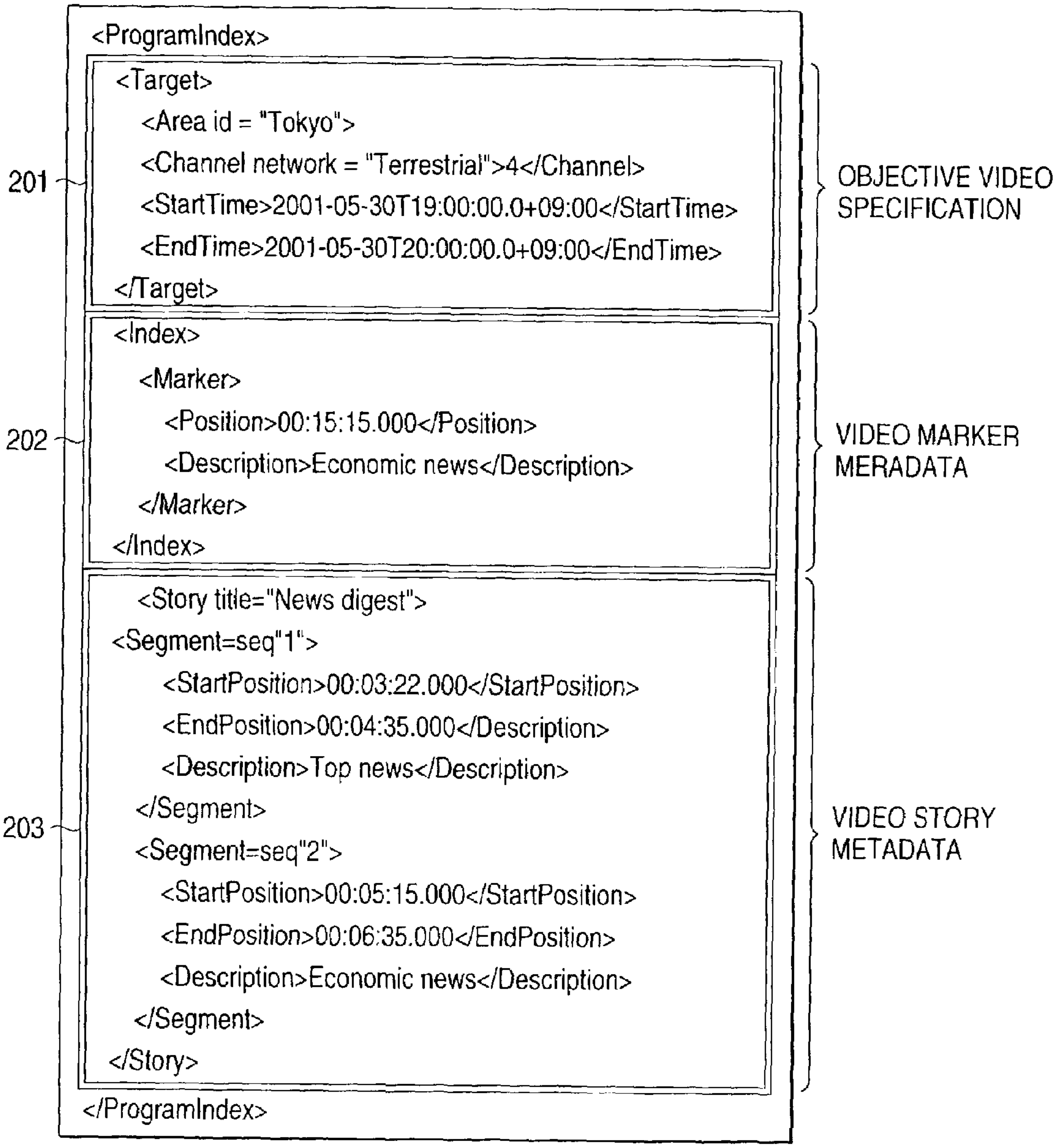

FIG. 5

```
<ProgramIndex>
    <Target>
        <Area id = "Tokyo">
        <Channel network = "Terrestrial">4</Channel>
        <StartTime>2001-05-30T19:00:00.0+09:00</StartTime>
        <EndTime>2001-05-30T20:00:00.0+09:00</EndTime>
    </Target>
    <Index>
        <Marker>
            <Position>00:15:15.000</Position>
            <Description>Economic news</Description>
        </Marker>
    </Index>
    <Story title="News digest">
    <Segment=seq"1">
        <StartPosition>00:03:22.000</StartPosition>
        <EndPosition>00:04:35.000</Description>
        <Description>Top news</Description>
    </Segment>
    <Segment=seq"2">
        <StartPosition>00:05:15.000</StartPosition>
        <EndPosition>00:06:35.000</EndPosition>
        <Description>Economic news</Description>
    </Segment>
    </Story>
</ProgramIndex>
```

- 201: OBJECTIVE VIDEO SPECIFICATION
- 202: VIDEO MARKER MERADATA
- 203: VIDEO STORY METADATA

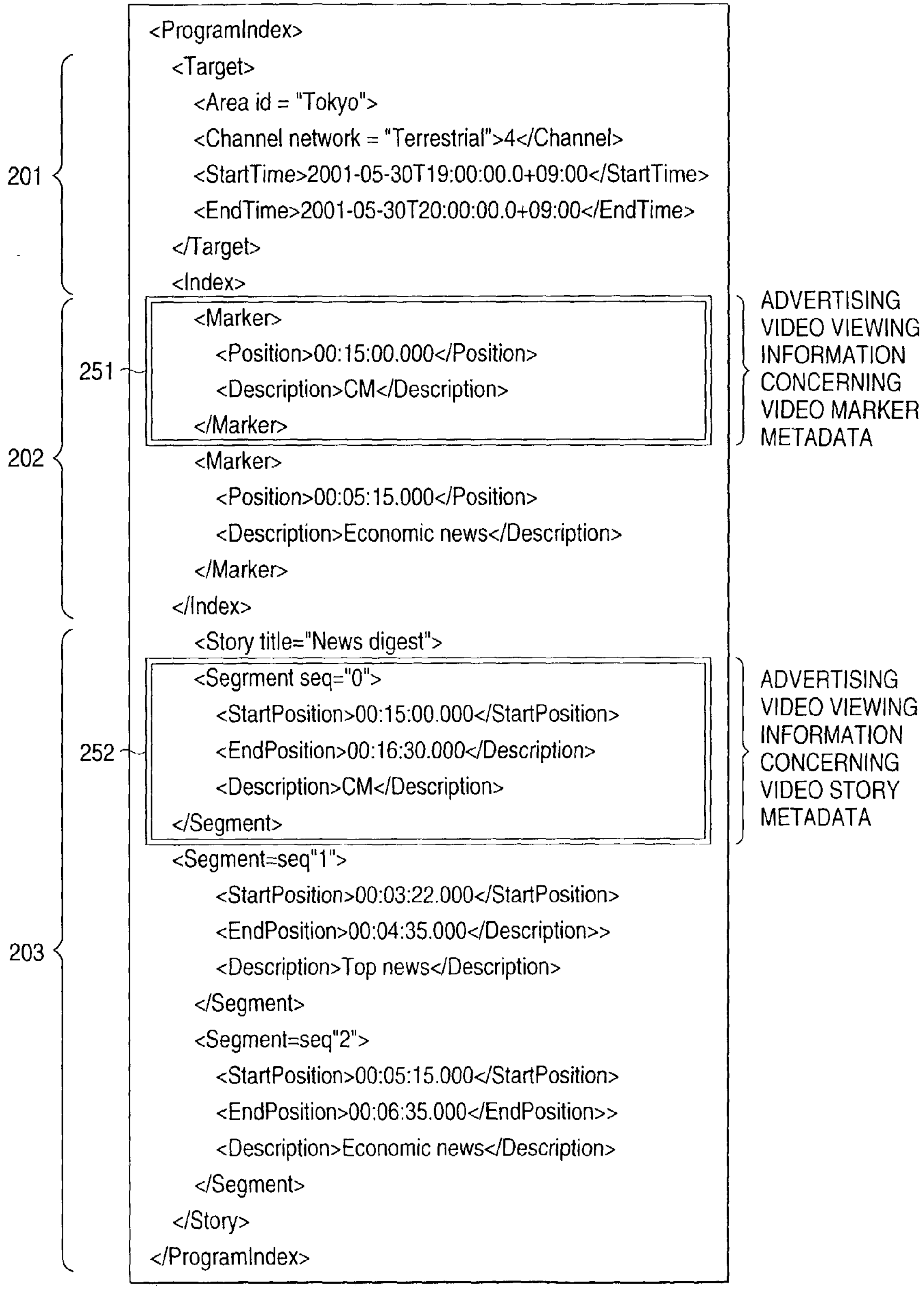

FIG. 12

```
<ProgramIndex>
    <Target>
        <Area id = "Tokyo">
        <Channel network = "Terrestrial">4</Channel>
        <StartTime>2001-05-30T19:00:00.0+09:00</StartTime>
        <EndTime>2001-05-30T20:00:00.0+09:00</EndTime>
    </Target>
    <Index>
        <Marker>
            <Position>00:15:00.000</Position>
            <Description>CM</Description>
        </Marker>
        <Marker>
            <Position>00:05:15.000</Position>
            <Description>Economic news</Description>
        </Marker>
    </Index>
    <Story title="News digest">
        <Segrment seq="0">
            <StartPosition>00:15:00.000</StartPosition>
            <EndPosition>00:16:30.000</Description>
            <Description>CM</Description>
        </Segment>
        <Segment=seq"1">
            <StartPosition>00:03:22.000</StartPosition>
            <EndPosition>00:04:35.000</Description>>
            <Description>Top news</Description>
        </Segment>
        <Segment=seq"2">
            <StartPosition>00:05:15.000</StartPosition>
            <EndPosition>00:06:35.000</EndPosition>>
            <Description>Economic news</Description>
        </Segment>
    </Story>
</ProgramIndex>
```

- 201: (Target block)
- 202: (Index block)
  - 251: ADVERTISING VIDEO VIEWING INFORMATION CONCERNING VIDEO MARKER METADATA
- 203: (Story block)
  - 252: ADVERTISING VIDEO VIEWING INFORMATION CONCERNING VIDEO STORY METADATA

INFORMATION PROCESSING APPARATUS AND METHOD, RECORDING MEDIUM, AND PROGRAM

CROSS-REFERENCE TO RELATED APPLICATIONS

The present application claims priority from Japanese Application No. 2001-195787 filed Jun. 28, 2001, the disclosure of which is hereby incorporated by reference herein.

BACKGROUND OF THE INVENTION

The present invention relates to an information processing apparatus and method, a recording medium, and a program, and particularly to an information processing apparatus and method, a recording medium, and a program in which a user is permitted to arbitrarily edit broadcast content according to the user's preference, and information of an advertisement can be certainly viewed.

Recently, a hard disk recorder has been commercialized and is coming into wide use. According to this hard disk recorder, broadcast content can be recorded as it is and can be viewed at any timing which the user desires. Besides, since a disk is used as the recording medium, random access is easy as compared with a magnetic tape, and it becomes possible to edit so that only a partial video in the broadcast content is suitably selected and is reproduced.

As stated above, in the case where each user can individually edit the broadcast content, it is conceivable to construct such a system that the edited information is distributed to another user and is used.

In this case, when each user cuts advertisement videos contained in respective pieces of broadcast content and edits them, and when the broadcast content containing the advertisement videos is secondarily used, the effect of the advertisement is lowered.

SUMMARY OF THE INVENTION

The present invention has as an object to enable an advertising video to be certainly viewed in the case where broadcast content is secondarily used.

An information processing apparatus of the invention includes a holding unit operable to hold second information to define a reproduction section and a reproduction order of first information; a change unit operable to change the second information held in the holding unit so that third information is reproduced in addition to the first information; and an output unit operable to output the second information changed by the change unit.

The information processing apparatus further includes a reception unit operable to receive a request for output of the second information from another information processing apparatus through a network; and a judgment unit operable to determine whether the another information processing apparatus holds the first information defined by the second information the output of which is requested by the another information processing apparatus, wherein, when the judgment unit determines that the another information processing apparatus holds the first information, the output unit can output the second information to the another information processing apparatus through the network.

The judgment unit further determines whether the another information processing apparatus holds the third information, and when it is determined that the another information processing apparatus does not hold the third information, the judgment unit can further determine whether the another information processing apparatus holds third information corresponding to different first information.

When the judgment unit determines that the another information processing apparatus holds the third information together with the first information, the output unit can output the second information to the another information processing apparatus.

The information processing apparatus further includes an acquisition unit operable to acquire the second information through the network, and the holding unit can hold the second information acquired by the acquisition unit.

The first information is broadcast content, the second information is meta-data, and the third information is advertisement information.

The information processing apparatus further includes a detection unit operable to detect a preference of a user of the another information processing apparatus, and a searching unit operable to search the third information corresponding to the preference detected by the detection unit, wherein the change unit can change the second information so that the third information searched by the searching unit is reproduced.

An information processing method of the invention includes holding second information to define a reproduction section and a reproduction order of first information; changing the second information so that third information is reproduced in addition to the first information; and outputting the changed second information.

A program of a recording medium of the invention includes holding second information to define a reproduction section and a reproduction order of first information; changing the second information so that third information is reproduced in addition to the first information; and outputting the changed second information.

A system of the invention for processing information includes a processor for executing instructions; and instructions, the instructions including holding second information to define a reproduction section and a reproduction order of first information; changing the second information so that third information is reproduced in addition to the first information; and outputting the changed second information.

In the invention, the second information is changed and is output so that the third information is reproduced in addition to the first information.

BRIEF DESCRIPTION OF THE DRAWINGS

FIG. 5 is a view showing an example of meta-data;

FIG. 12 is a view showing an example of a change of meta-data;

DETAILED DESCRIPTION

Figure 1:
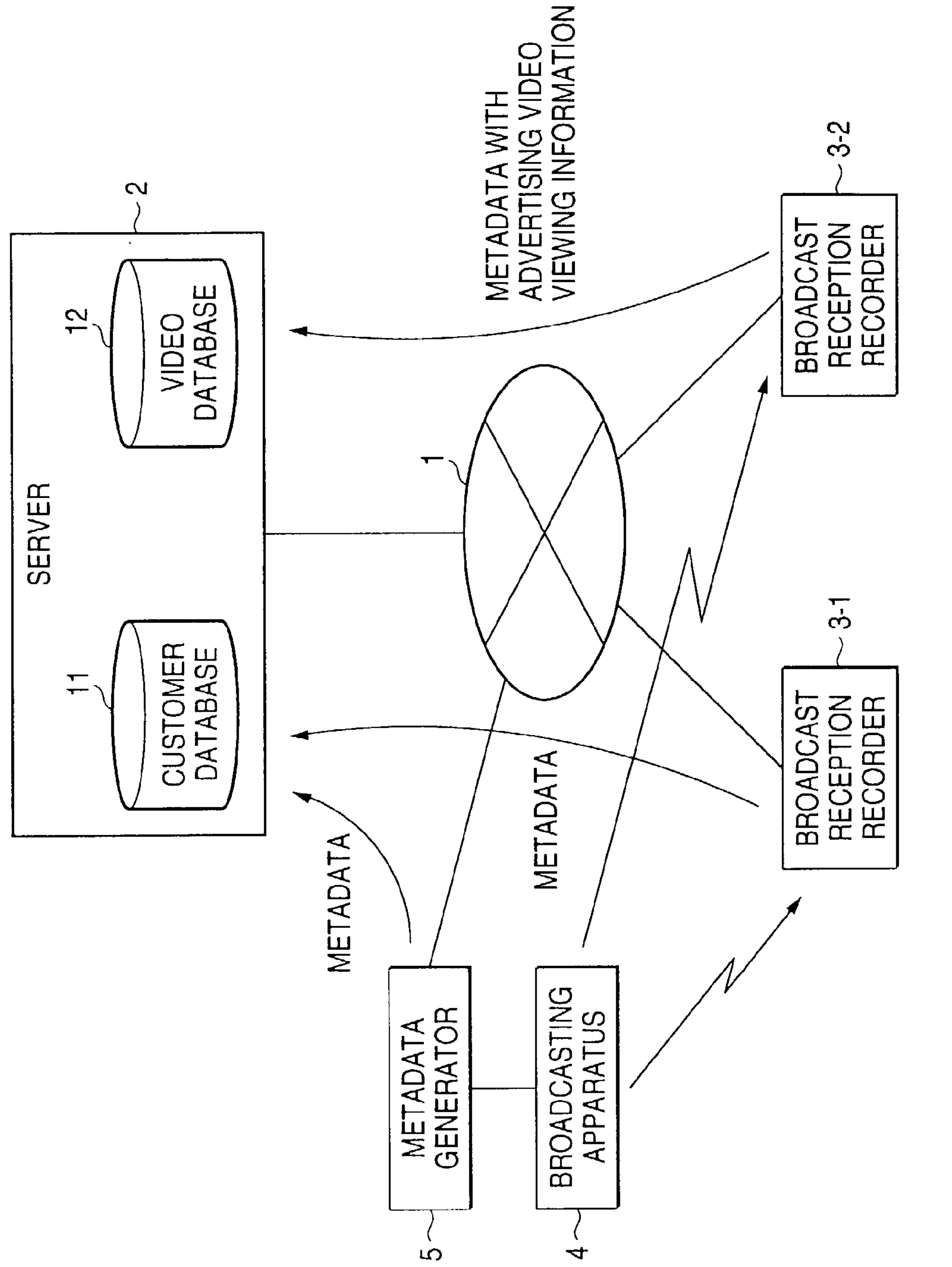
FIG. 1 is a block diagram showing an information providing system to which the invention is applied.

FIG. 1 shows a structural example of an information providing system to which the present invention is applied. In this structural example, a network 1 typified by the Internet is connected with a server 2 and broadcast reception recorders 3-1 and 3-2. In this example, there is one server 2 and two broadcast reception recorders 3-1 and 3-2, however, the number of units connected is arbitrary.

The broadcast reception recorders 3-1 and 3-2 have a function to receive and record broadcast content broadcast by a broadcasting apparatus 4. A meta-data generator 5 generates meta-data concerning the content broadcast by the broadcasting apparatus 4, supplies it to the server 2 through the network 1, and causes it to be stored.

Besides, meta-data generated by the users of the broadcast reception recorders 3-1 and 3-2 on the basis of the received content is also suitably transmitted to the server 2 through the network 1.

The server 2 includes a customer database 11 and a video database 12, and stores the meta-data transmitted through the network 1 in the video database 12. Information of an administrator of the broadcasting apparatus 4 (meta-data generator 5) or the users of the broadcast reception recorders 3-1 and 3-2 is registered in the customer database 11 in advance. That is, the information necessary for authentication is registered in the customer database 11 of the server 2 in advance. In this information providing system, the meta-data is delivered through the network 1.

Figure 2:
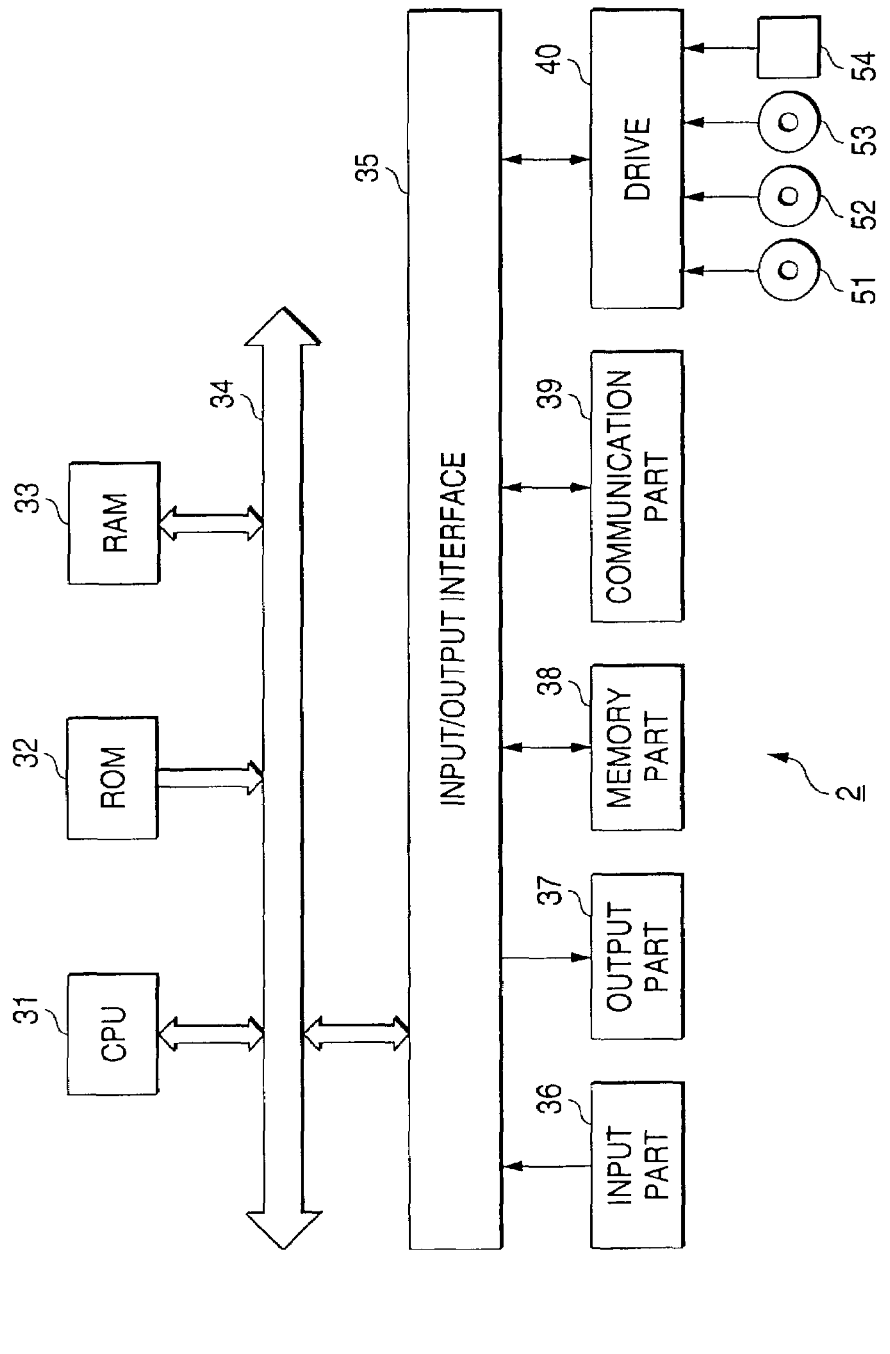
FIG. 2 is a block diagram showing a structural example of a server of FIG. 1.

FIG. 2 shows a structural example of the server 2. In FIG. 2, a CPU (Central Processing Unit) 31 executes various processes in accordance with programs stored in a ROM (Read Only Memory) 32 or programs loaded from a memory part 38 to a RAM (Random Access Memory) 33. Data necessary for the CPU 31 to execute various processings are also suitably stored in the RAM 33.

The CPU 31, the ROM 32, and the RAM 33 are mutually connected to each other through a bus 34. An input/output interface 35 is also connected to the bus 34.

The input/output interface 35 is connected with an input part 36 including a keyboard, a mouse and the like; an output part 37 formed of a display, such as a CRT or an LCD, a speaker and the like; a memory part 38 constituted by a hard disk and the like; and a communication part 39 constituted by a modem, a terminal adapter and the like. The communication part 39 carries out communication processing through the network including the Internet.

The input/output interface 35 is connected with a drive 40 in which a magnetic disk 51, an optical disk 52, a magneto-optical disk 53, a semiconductor memory 54 or the like is suitably mounted, and computer programs read out from those are installed in the memory part 38 as the need arises.

Figure 3:
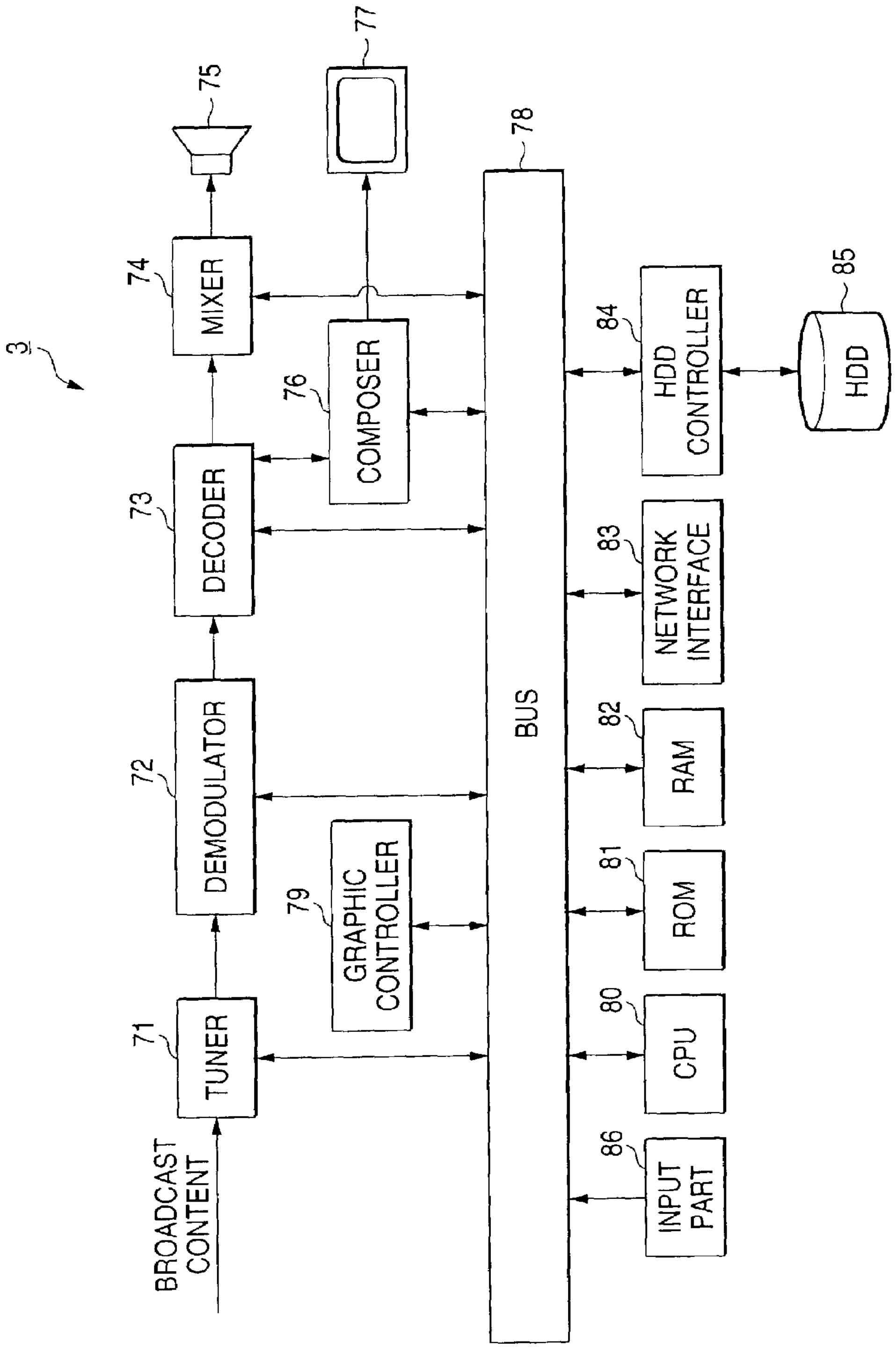
FIG. 3 is a block diagram showing the structure of a broadcast reception recorder of FIG. 1.

FIG. 3 shows a structural example of the broadcast reception recorder 3 (hereinafter, in the case where it is not necessary to individually distinguish between the broadcast reception recorders 3-1 and 3-2, each of them is merely referred to as the broadcast reception recorder 3). A tuner 71 receives an electric wave including broadcast content broadcast by the broadcasting apparatus 4, and outputs a base band signal to a demodulator 72. The demodulator 72 demodulates the signal output from the tuner 71 and outputs it to a decoder 73. The decoder 73 decodes the demodulated signal input from the demodulator 72 or a signal read out from a hard disk drive (HDD) 85 through a hard disk drive (HDD) controller 84 on the basis of, for example, an MPEG system, outputs a video signal to a composer 76, and outputs an audio signal to a mixer 74.

The composer 76 superimposes a video signal generated and output by a graphic controller 79 through a bus 78 onto the video signal input from the decoder 73 as the need arises, outputs it to a monitor 77, and causes a display to be carried out. The mixer 74 mixes another audio signal with the audio signal supplied from the decoder 73 as the need arises, supplies it to a speaker 75, and causes sound to be produced.

A CPU 80 controls the respective parts of the broadcast reception recorder 3 through the bus 78, and causes various processes to be executed. Programs and parameters necessary for the CPU 80 to execute various processes are stored in a ROM 81. Programs and data necessary for the CPU 80 to execute various processes are suitably developed in a RAM 82. An input part 86 is operated by the user and outputs a signal corresponding to the operation to the CPU 80.

A network interface (I/F) 83 executes communication processes through the network 1. The hard disk drive controller 84 controls the hard disk drive 85, causes necessary data to be recorded thereon, and causes recorded data to be read out.

Next, the operation of the system of FIG. 1 will be described. When receiving the content broadcast by the broadcasting apparatus 4, the user of the broadcast reception recorder 3 operates the input part 86 and gives an instruction to receive the content of a designated channel. When the instruction input from the input part 86 is received, the CPU 80 controls the tuner 71 and causes it to receive the electric wave of the content of the designated channel.

When the electric wave of the designated channel is received, the tuner 71 outputs the received signal to the demodulator 72. The demodulator 72 demodulates the received signal and outputs it to the decoder 73. The decoder 73 decodes the demodulated signal, outputs the video signal to the monitor 77 through the composer 76, and causes a display to be carried out. In addition, the decoder 73 outputs the audio signal to the speaker 75 through the mixer 74 and causes sound to be produced. In this way, the user of the broadcast reception recorder 3 can view the content of the desired channel.

In the case where the user gives an instruction to record the received content, the signal output from the decoder 73 is supplied to the hard disk drive 85 through the hard disk drive controller 84, and is recorded on a built-in hard disk. This recording operation can be executed even in the state where the video signal and the audio signal are not output from the monitor 77 or the speaker 75.

When the user requests reproduction of the content recorded on the hard disk by operating the input part 86, the CPU 80 controls the hard disk drive controller 84, and causes the specified content recorded on the hard disk of the hard disk drive 85 to be reproduced. The reproduced signal is decoded by the decoder 73, and the video signal is output to the monitor 77 through the composer 76 and is displayed. Additionally, the audio signal is output to the speaker 75 through the mixer 74. In this way, the user can view the content recorded on the hard disk at any time.

Figure 4A:
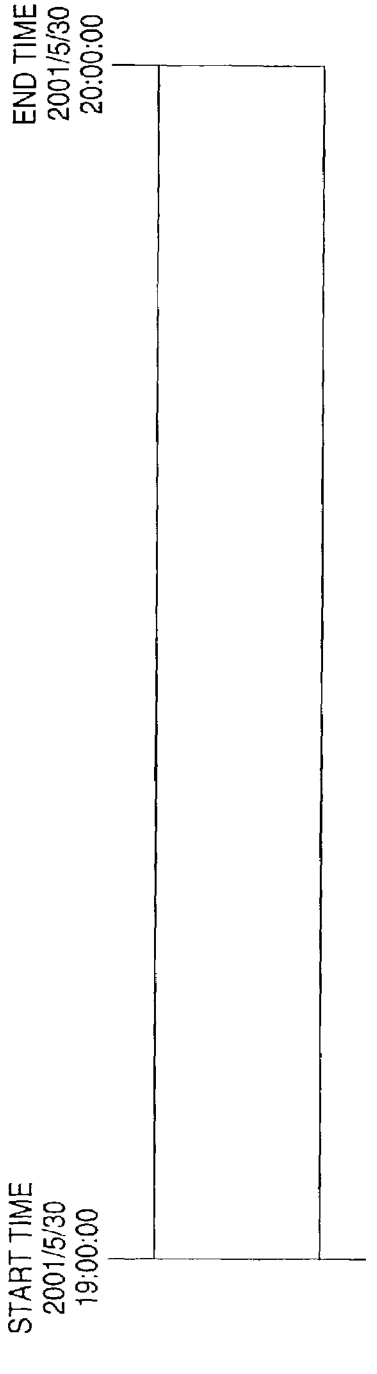
FIGS. 4A and 4B are views showing the structure of broadcast content.
Figure 4B:
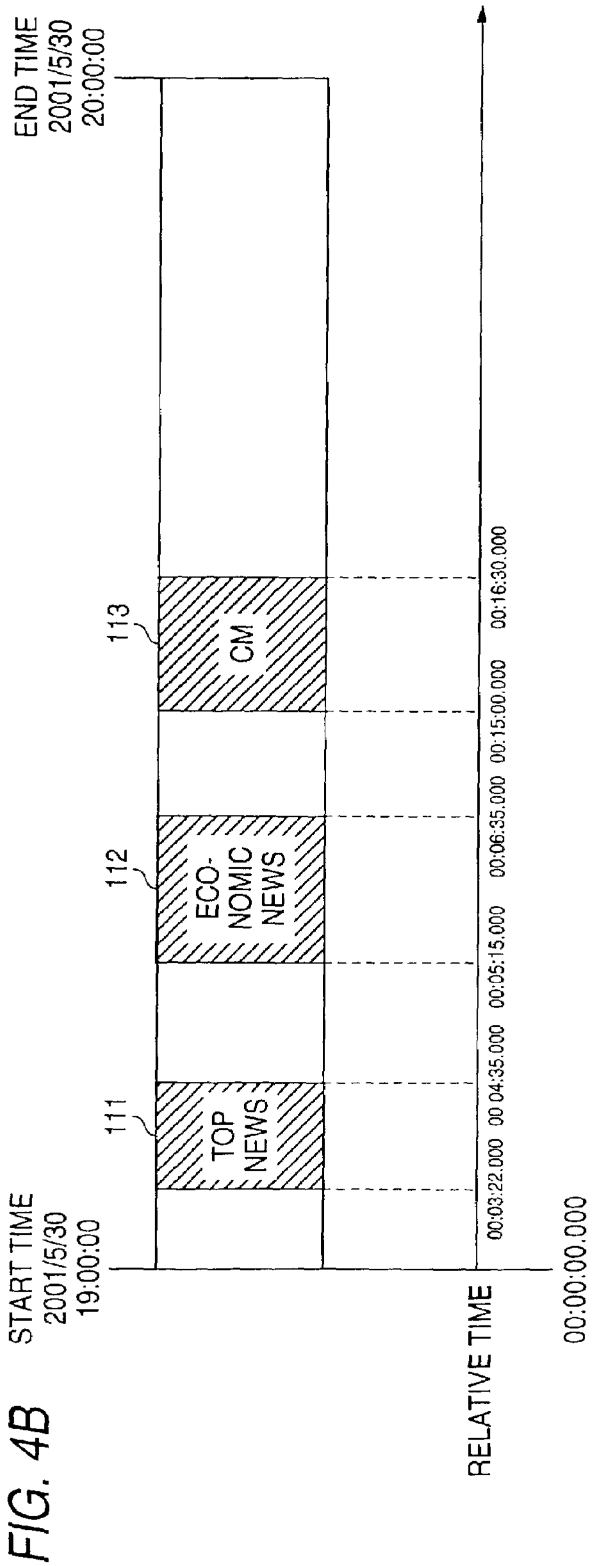

The user also can edit data recorded on the hard disk as the need arises, and can record the edit state as meta-data on the hard disk. For example, as shown in FIG. 4A, it is assumed that the content, the broadcast of which was started from 19:00:00 of May 30, 2001 and was ended at 20:00:00 of May 30, 2001, is recorded on the hard disk drive 85. The user extracts specific portions from the content of one hour according to his or her personal preference, and can create new content composed of only the extracted portions. For example, as shown in FIG. 4B, from the content of one hour shown in FIG. 4A, it is assumed that a portion 111 of Top news from, by a relative time with the start time of the content as a reference, a position of 3 minutes and 22 seconds to a position of 4 minutes and 35 seconds, and a portion 112 of Economic news from a position of 5 minutes and 15 seconds to a position of 6 minutes and 35 seconds, have been extracted. At this time, the CPU 80 generates meta-data corresponding to the content constituted by the portions 111 and 112. FIG. 5 shows an example of the meta-data generated in this case.

In the example of FIG. 5, an objective video is specified by a block 201. Area id="Tokyo" indicates that the area where this content was broadcast is Tokyo. Channel network="Terrestrial">4</Channel> indicates that the content was broadcast by terrestrial Channel 4. The next "StartTime" indicates that the broadcast start time of this content is 19:00 of May 30, 2001, and "EndTime" indicates that the end time of the broadcast is 20:00 of May 30, 2001.

A next block 202 of video marker meta-data indicates an index as a destination to jump to at the time of scanning. In this example, a position of 5 minutes and 15 seconds in relative time is specified as the index. The Description of this index is "Economic news".

A block 203 of video story meta-data specifies two segments, seq=1 and seq=2. The start time of the segment seq=1 is 3 minutes and 22 seconds by the relative time, and the end time is 4 minutes and 35 seconds by the relative time. The Description is "Top news".

In the segment seq=2, the relative time of the start time is 5 minutes and 15 seconds, and the relative time of the end time is 6 minutes and 35 seconds. The Description of the segment is "Economic news".

In the case where the video marker meta-data is generated as the index, when an instruction to scan is issued at the time of reproduction, the video is reproduced while an operation to jump to an index position is successively repeated.

On the other hand, in the case where data is specified as the video story meta-data, the range of each segment defined by the start point and the end point is successively reproduced.

That is, in the example of FIG. 5, the reproduction of a portion 113 of a commercial (advertisement information) from 15 minutes and 00 seconds to 16 minutes and 30 seconds by the relative time shown in FIG. 4B is not specified.

Figure 6:
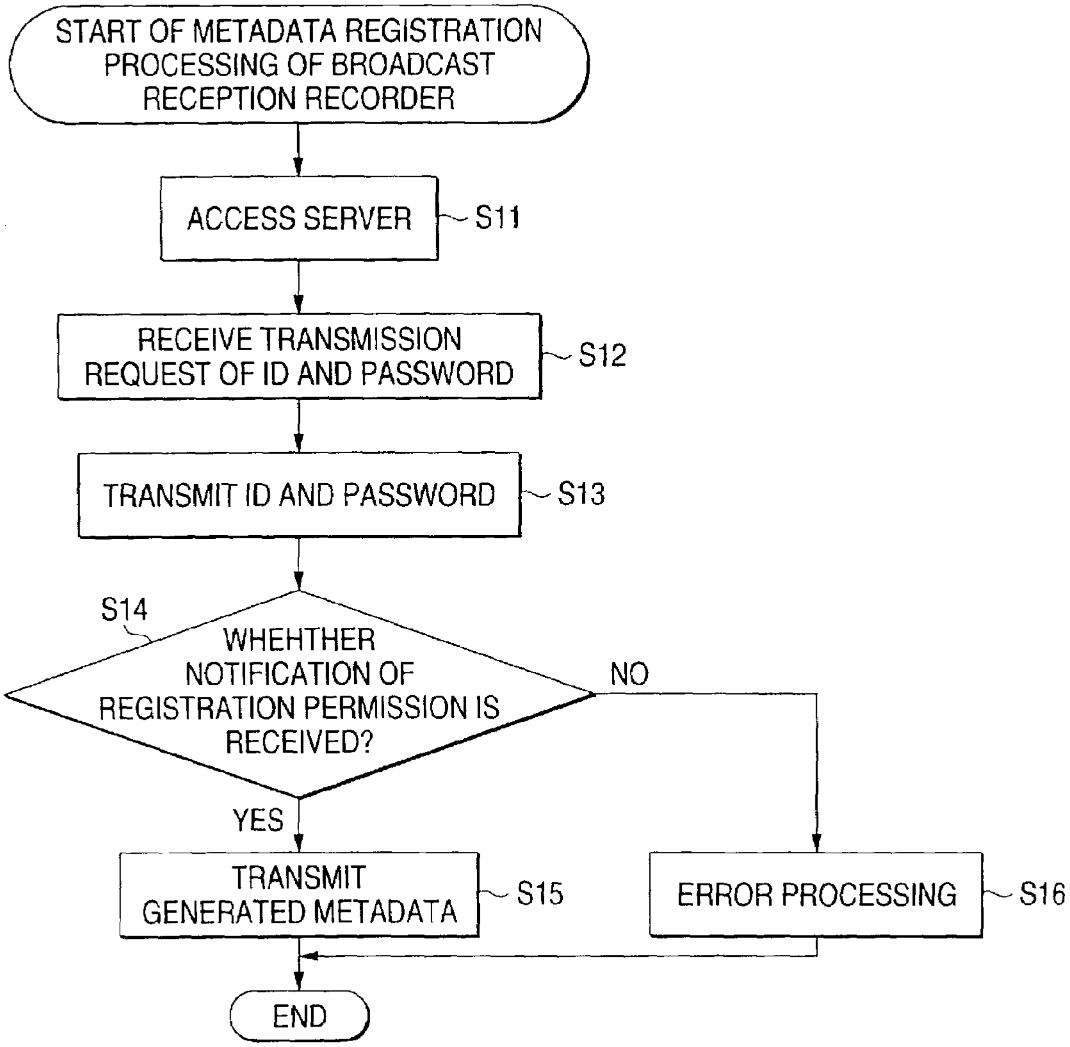
FIG. 6 is a flowchart for explaining a meta-data registration process of the broadcast reception recorder of FIG. 3.
Figure 7:
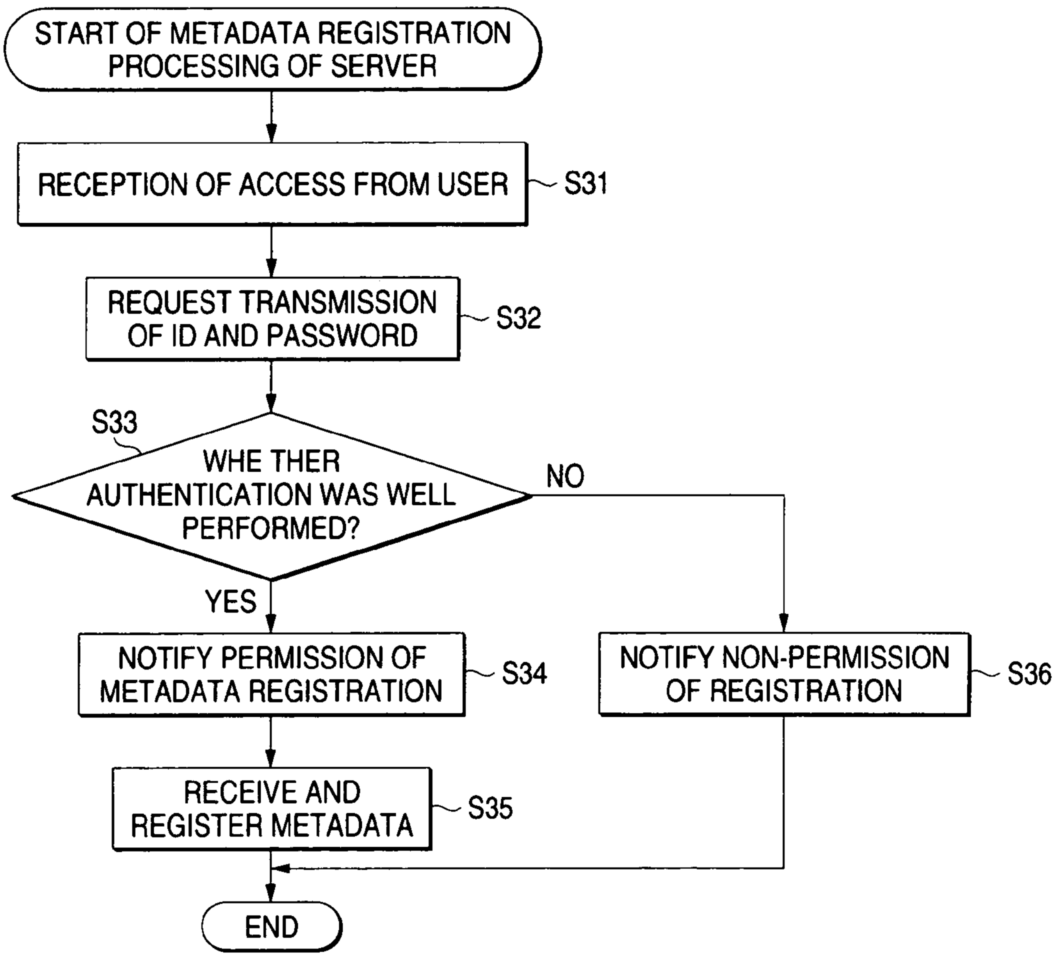
FIG. 7 is a flowchart for explaining a meta-data registration process of the server of FIG. 2.

Now, for example, when the user of the broadcast reception recorder 3-1 generates the meta-data as shown in FIG. 5 and desires to make the meta-data available to other users, the user of the broadcast reception recorder 3-1 transmits the generated meta-data to the server 2 and causes it to be registered. The processing for this case will be described with reference to the flowcharts of FIGS. 6 to 8. FIG. 6 shows the processing of the broadcast reception recorder 3-1, and FIG. 7 shows the processing of the server 2 corresponding to the processing of the broadcast reception recorder 3-1. Hereinafter, although the operations of the broadcast reception recorder 3-1 and the server 2 are individually explained, the relationship between both will become apparent by referring to the flowchart of FIG. 8.

When transmitting the generated meta-data to the server 2, the user of the broadcast reception recorder 3-1 operates the input part 86 and instructs the CPU 80 to access the server 2. When this instruction is input, the CPU 80 controls the network interface 83 at step S11, and causes access to the server 2 through the network 1. When accessed, the server 2 requests transmission of an ID and a password (step S32 of FIGS. 7 and 8).

Then, at step S12, when the transmission request for the ID and the password is received from the server 2 through the network interface 83, the CPU 80 of the broadcast reception recorder 3-1 causes the graphic controller 79 to create a screen to request the input of the ID and the password, and causes the monitor 77 to display the screen through the composer 76. The user operates the input part 86 on the basis of this display, and inputs the ID and password previously assigned to the user from the server 2. At step S13, the CPU 80 causes the ID and password input by the user through the input part 86 to be transmitted to the server 2 through the network interface 83.

Figure 8:
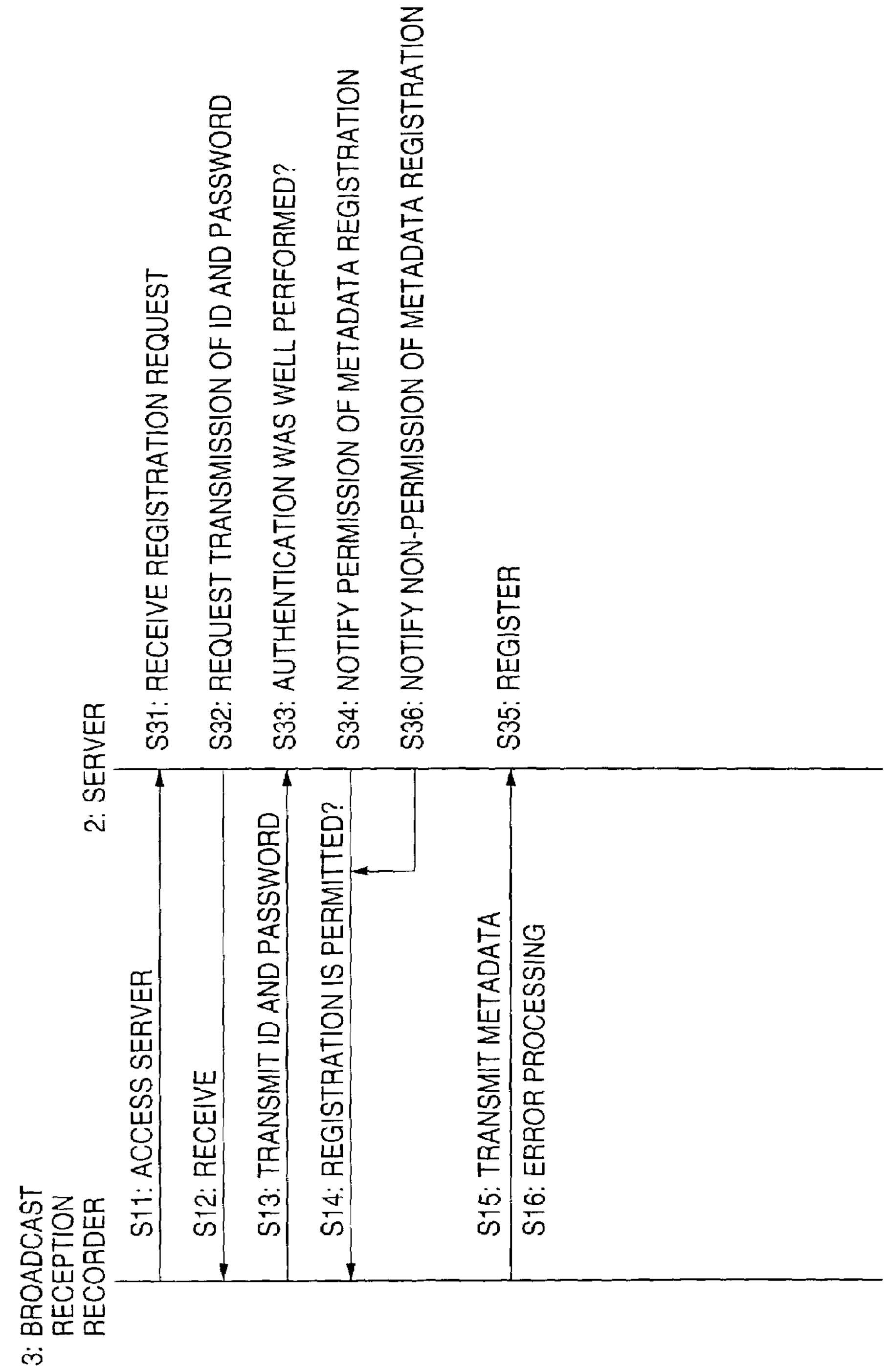
FIG. 8 is a view for explaining the relationship between the processes of FIGS. 6 and 7.

The server 2 carries out an authentication process on the basis of the ID and password, and in the case where they are authenticated, a notice is issued permitting the registration of the meta-data (step S34 of FIGS. 7 and 8). In the case where the ID and password are not authenticated, a notice is issued denying permission to register the meta-data (step S36 of FIGS. 7 and 8).

Then, at step S14, the CPU 80 of the broadcast reception recorder 3-1 determines whether a notice permitting registration has been received from the server 2, and in the case where the notice permitting registration has been received, the procedure proceeds to step S15, and the generated meta-data is read out from the hard disk drive 85 and is transmitted to the server 2 through the network interface 83. The transmitted meta-data is registered in the server 2 (step S35 of FIGS. 7 and 8).

On the other hand, at step S14, in the case where it is determined that a notice permitting registration has not been received (in the case where it is determined that a notice denying registration permission has been received), the procedure proceeds to step S16, and the CPU 80 executes error processing. That is, in this case, since a correct authentication result could not be obtained, the user cannot register the meta-data in the server 2. The CPU 80 controls the graphic controller 79 to create an error message, and causes it to be output to the monitor 77 through the composer 76 and to be displayed. By this, the user can know that the meta-data registration process cannot be carried out.

On the other hand, corresponding to the processing of the broadcast reception recorder 3-1, the CPU 31 of the server 2 executes the processing shown in the flowchart of FIG. 7.

At step S31, when it is accessed by the broadcast reception recorder 3-1 through the communication part 39, the CPU 31 reads out, at step S32, a message screen which is stored in the memory part 38 requesting transmission of an ID and a password, and causes it to be transmitted to the broadcast reception recorder 3-1 from the communication part 39 through the network 1.

On the basis of this request, as described above, the ID and password are transmitted from the broadcast reception recorder 3-1 (step S13 of FIGS. 6 and 8). Then, at step S33, when the ID and password are received from the broadcast reception recorder 3-1 through the communication part 39, the CPU 31 compares these with the ID and password of the user stored in the customer database 11 of the memory part 38. In the case where both are coincident with each other, it is determined that they are authenticated, the procedure proceeds to step S34, and the CPU 31 creates a message of notification that the registration of the meta-data is permitted, and causes the message to be transmitted to the broadcast reception recorder 3-1 through the communication part 39. Since the meta-data is transmitted from the broadcast reception recorder 3 corresponding to the notification of the meta-data registration permission (step S15 of FIGS. 6 and 8), when the meta-data is received through the communication part 39 at step S35, the CPU 31 supplies the meta-data to the video database 12 constituting the memory part 38 and causes it to be registered.

On the other hand, at step S33, in the case where the ID and password transmitted from the broadcast reception recorder 3-1 are not coincident with the ID and password previously registered in the customer database 11, the CPU 31 determines that authentication has not been made, proceeds to step S36, creates a message of notification that the registration of the meta-data is not permitted, and causes the communication part 39 to transmit the message to the broadcast reception recorder 3-1.

In the manner described above, the meta-data generated by the users of many broadcast reception recorders 3 are transmitted to and registered in the video database 12 of the server 2. Of course, the meta-data generated by the meta-data generator 5 is also registered. By this, on the basis of the meta-data generated by the other users, the respective users using this system can enjoy their own content.

Figure 9:
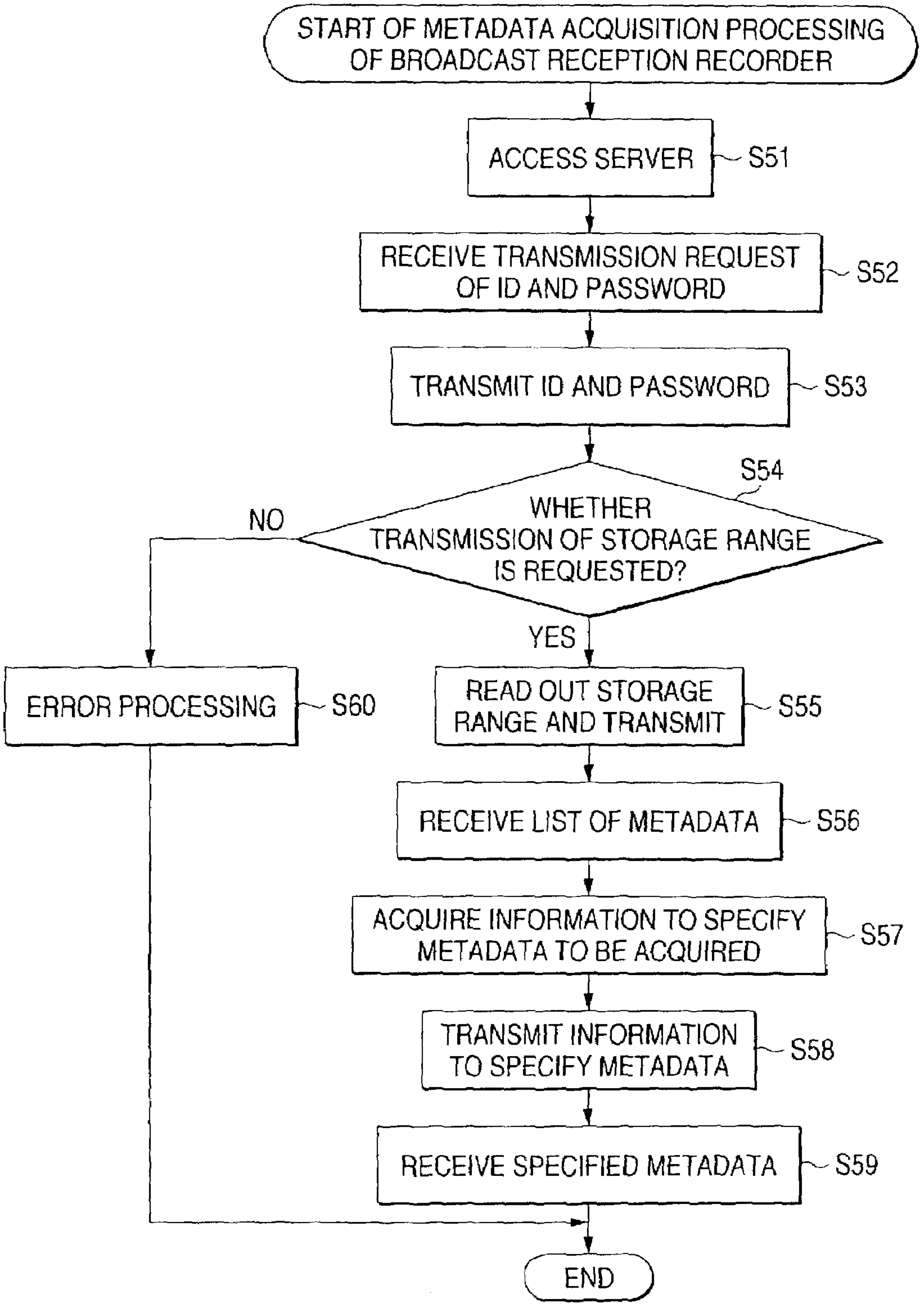
FIG. 9 is a flowchart for explaining a meta-data acquisition process of the broadcast reception recorder of FIG. 3.
Figure 10:
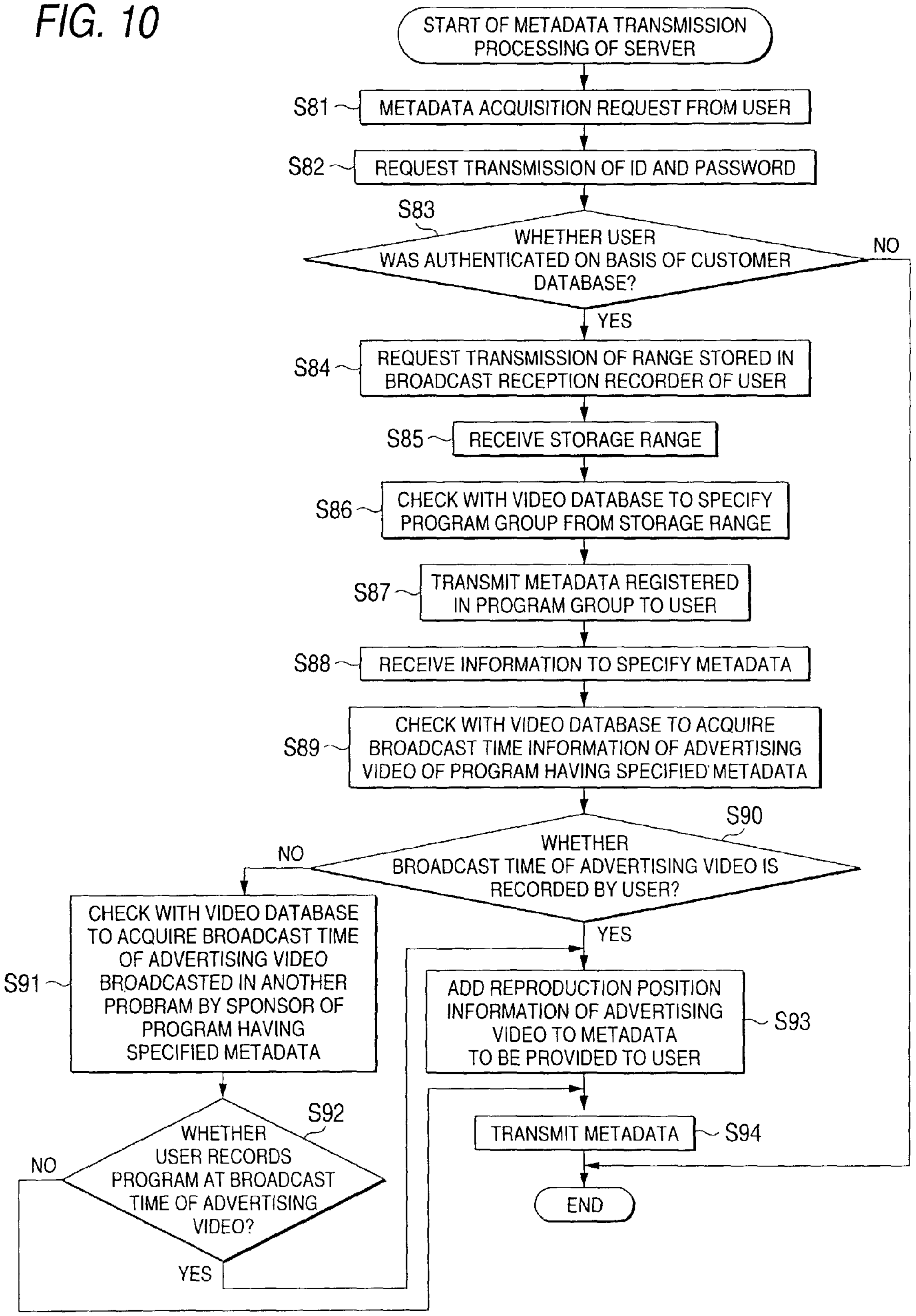
FIG. 10 is a flowchart for explaining a meta-data transmission process of the server of FIG. 2.

For that purpose, for example, the user of the broadcast reception recorder 3-2 accesses the server 2 and executes a process of capturing the meta-data generated by the other user registered therein. Next, the processing in this case will be described with reference to the flowcharts of FIGS. 9 to 11. FIG. 9 shows the processing of the broadcast reception recorder 3-2, and FIG. 10 shows the processing of the server 2 corresponding to that. Hereinafter, although the processings of the broadcast reception recorder 3-2 and the server 2 are individually described with reference to FIGS. 9 and 10, the relationship between the processings of both will become apparent by referring to the flowchart of FIG. 11.

First, the processing of the broadcast reception recorder 3-2 will be described with reference to the flowchart of FIG. 9. At step S51, when an instruction to access the server 2 is given by the user through the input part 86, the CPU 80 causes the user to access the server 2 through the network interface 83. Since the transmission of the ID and password is requested from the server 2 on the basis of the access (step S82 of FIGS. 10 and 11), at step S52, when the transmission request for the ID and password is received, the CPU 80 outputs this to the monitor 77 and causes it to be displayed. On the basis of this display, the user of the broadcast reception recorder 3-2 operates the input part 86 to input the ID and password assigned to the user. The CPU 80 causes the input ID and password to be transmitted to the server 2 through the network interface 83 at step S53.

Figure 11:
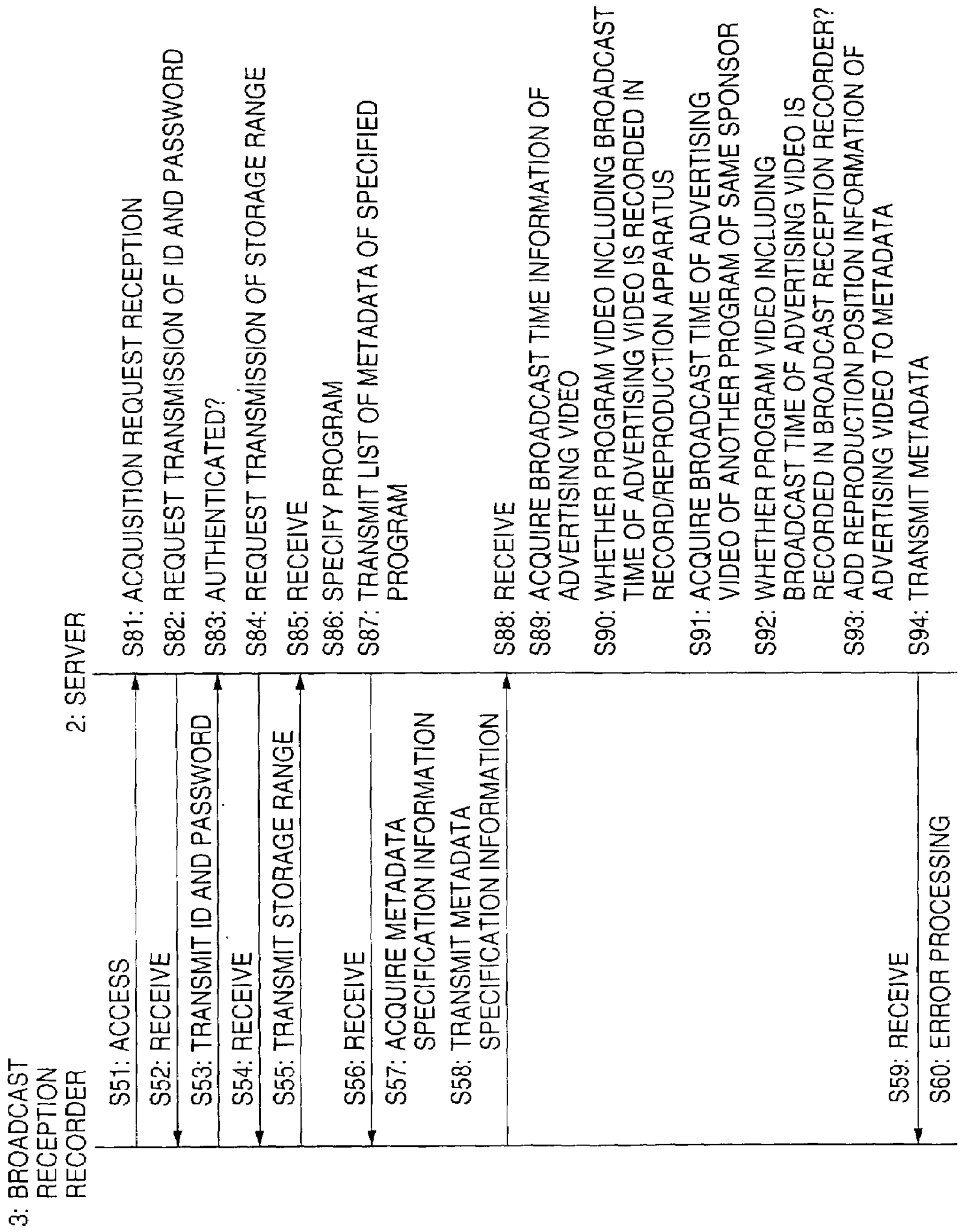
FIG. 11 is a view for explaining the relationship between the processes of FIGS. 9 and 10.

The server 2 carries out the authentication process on the basis of the ID and password, and in the case where a correct authentication result is obtained, the server 2 requests transmission of information indicating the range stored in the broadcast reception recorder 3-2 (step S84 of FIGS. 10 and 11). On the other hand, in the case where a correct authentication result is not obtained, transmission of such storage region is not requested. Then, at step S54, the CPU 80 determines whether the transmission of the storage region has been requested, and in the case where the transmission of the storage region has not been requested, the procedure proceeds to step S60, and the CPU 80 executes error processing. That is, since the correct authentication result could not be obtained in this case, the user of the broadcast reception recorder 3-2 cannot obtain the meta-data.

At step S54, in the case where it is determined that the transmission of the storage range has been requested, the procedure proceeds to step S55, and the CPU 80 reads out the range of the broadcast time of the content stored in the hard disk drive 85, and causes it to be transmitted to the server 2 through the network interface 83. This range includes a broadcast channel as well. From this, the server 2 can specify what is the broadcast content stored in the hard disk drive 85 of the broadcast reception recorder 3-2.

When it receives the data in the storage range, the server 2 searches the meta-data corresponding to the content included in the storage range, and transmits the list (step S87 of FIGS. 10 and 11). Then, at step S56, when it receives the list of the meta-data through the network interface 83, the CPU 80 outputs it to the monitor 77 and causes it to be displayed. The user sees the display, and operates the input part 86 to select a desired piece of meta-data from the list. When the meta-data is specified by the user, the CPU 80 acquires specification information (information to specify the meta-data) for the meta-data to be acquired at step S57, and causes the specification information to be transmitted to the server 2 through the network interface 83 at step S58.

When the specification information for the meta-data is received, the server 2 transmits the corresponding meta-data (step S94 of FIGS. 10 and 11). Then, at step S59, when the meta-data transmitted from the server 2 is received, the CPU 80 supplies it to the hard disk drive 85 and causes it to be recorded.

Next, the processing of the server 2 executed in correspondence to the processing of the broadcast reception recorder 3-2 will be described with reference to the flowchart of FIG. 10.

When the meta-data acquisition request is received from the user of the broadcast reception recorder 3-2 at step S81, the CPU 31 requests the broadcast reception recorder 3-2 to transmit the ID and password at step S82. On the basis of this request, as described above, the broadcast reception recorder 3-2 transmits the ID and password (step S53 of FIGS. 9 and 11).

Then, at step S83, when the ID and password are received from the broadcast reception recorder 3-2 through the communication part 39, the CPU 31 authenticates the user on the basis of whether the ID and password are coincident with the ID and password previously registered in the customer database 11. In the case where a correct authentication result has not been obtained, since the user is not a user who can receive the meta-data delivery service, the processing is ended.

On the other hand, in the case where a correct authentication result has been obtained, the procedure proceeds to step S84, and the CPU 31 requests the broadcast reception recorder 3-2 to transmit the information on the range of the content stored therein. As described above, on the basis of this request, the broadcast reception recorder 32 reads out and transmits the storage range of the content stored in the hard disk drive 85 (step S55 of FIGS. 9 and 11). Then, at step S85, when the storage range is received, the CPU 31 specifies a content group corresponding to the storage range from the registration information of the video database 12 at step S86.

Next, at step S87, the CPU 31 reads out the registered meta-data corresponding to the content group specified at step S86 from the video database 12, and causes it to be transmitted to the broadcast reception recorder 3-2.

When the list of the meta-data is transmitted in this way, the specification information to specify at least one therein is transmitted from the broadcast reception recorder 3-2 (step S58 of FIGS. 9 and 11). Then, at step S88, when the specification information for the meta-data is transmitted from the broadcast reception recorder 3-2, the CPU 31 receives this, and acquires, at step S89, broadcast time information for an advertising video of the content having the specified meta-data from the registration information of the video database 12.

For example, when the content as the object of the meta-data is the content shown in FIG. 4A, the time, by the relative time, from 15 minutes and 00 second to 16 minutes and 30 seconds of the portion 113 as the advertisement information contained therein is acquired here.

Next, the procedure proceeds to step S90, and the CPU 31 determines whether the broadcast reception recorder 3-2 has recorded the video of the time zone including the broadcast time of the advertising video acquired by the process of step S89 on the basis of the storage range received at step S85. In the case where the content of the broadcast time of the advertising video has been stored in the broadcast reception recorder 3-2, the procedure proceeds to step S93, and the CPU 31 executes a process to add reproduction position information of the advertising video to the meta-data to be transmitted to the broadcast reception recorder 3-2.

For example, as shown in FIG. 5, although the portion 111 and the portion 112 shown in FIG. 4B are included as the reproduction range in the meta-data generated by the user of the broadcast reception recorder 3-1, the portion 113 containing the advertisement information is not included. However, the broadcast reception recorder 3-2 stores the video information (advertising video) of the portion 113. Then, in this case, the CPU 31 changes the meta-data shown in FIG. 5 into the meta-data shown in FIG. 12.

That is, in the meta-data shown in FIG. 12, a block 251 of a marker specifying the head position of the portion 113 corresponding to the advertisement information in FIG. 4 is added to the block 202 of the video marker meta-data. That is, in this marker (in the block 251), a relative time of 15 minutes and 00 seconds shown in FIG. 4B is specified. The Description of this portion is "CM".

By this, when an instruction for scanning is issued, the portion 113 is certainly specified as the jump destination.

Besides, a block 252 of a head segment (segment of seq=0) is added to the block 203 of the video story meta-data. This segment has a start position of 15 minutes and 00 seconds and an end position of 16 minutes and 30 seconds, and corresponds to the portion 113 of FIG. 4B. The Description of this portion is "CM".

By this, when the content information is reproduced on the basis of this meta-data, the portion 113 is first reproduced, the portion 111 is next reproduced, and then, the portion 112 is reproduced sequentially.

On the other hand, at step S90, in the case where it is determined that the broadcast time of the advertisement information has not been stored in the hard disk drive 85 of the broadcast reception recorder 3-2, the procedure proceeds to step S91, and on the basis of the registration information of the video database 12, when advertisement information of the same sponsor as the advertisement information contained in the content corresponding to the specified meta-data is contained in other content, the CPU 31 acquires the broadcast time. Then, the CPU 31 determines at step S92 whether the information of the content containing the broadcast time acquired by the processing of step S91 has been stored in the hard disk drive 85 of the broadcast reception recorder 3-2. In the case where the content of the broadcast time has been recorded in the hard disk drive 85, the procedure proceeds to step S93, and similarly to the foregoing case, a process is executed to add the reproduction position information of the advertisement information to the meta-data.

In this way, by the processing of step S93, the meta-data added to the reproduction position information of the advertising video is transmitted from the server 2 to the broadcast reception recorder 3-2 through the network 1 at step S94. By the above processing, the advertisement information is added to the transmitted meta-data without fail.

On the other hand, at step S92, in the case where it is determined that the information of the broadcast time acquired by the processing of step S91 has not been stored in the hard disk drive 85 of the broadcast reception recorder 3-2 (also including the case where advertisement information of the same sponsor is not included in the other content), the process to add the reproduction position information of the advertising video to the meta-data at step S93 is omitted. Then, at step S94, a meta-data transmission process is executed. That is, advertisement information is not necessarily added to the meta-data transmitted in this case.

In the above example, in the case where advertisement information has not been stored in the broadcast reception recorder 3-2, the meta-data (meta-data without change) is transmitted without adding reproduction position information for advertisement information. However, in the case where advertisement information has not been stored in the broadcast reception recorder 3, it is also possible to forbid the transmission of the meta-data. In this case, in the case where a determination of NO has been made at step S92, the process of step S94 is skipped.

Figure 13:
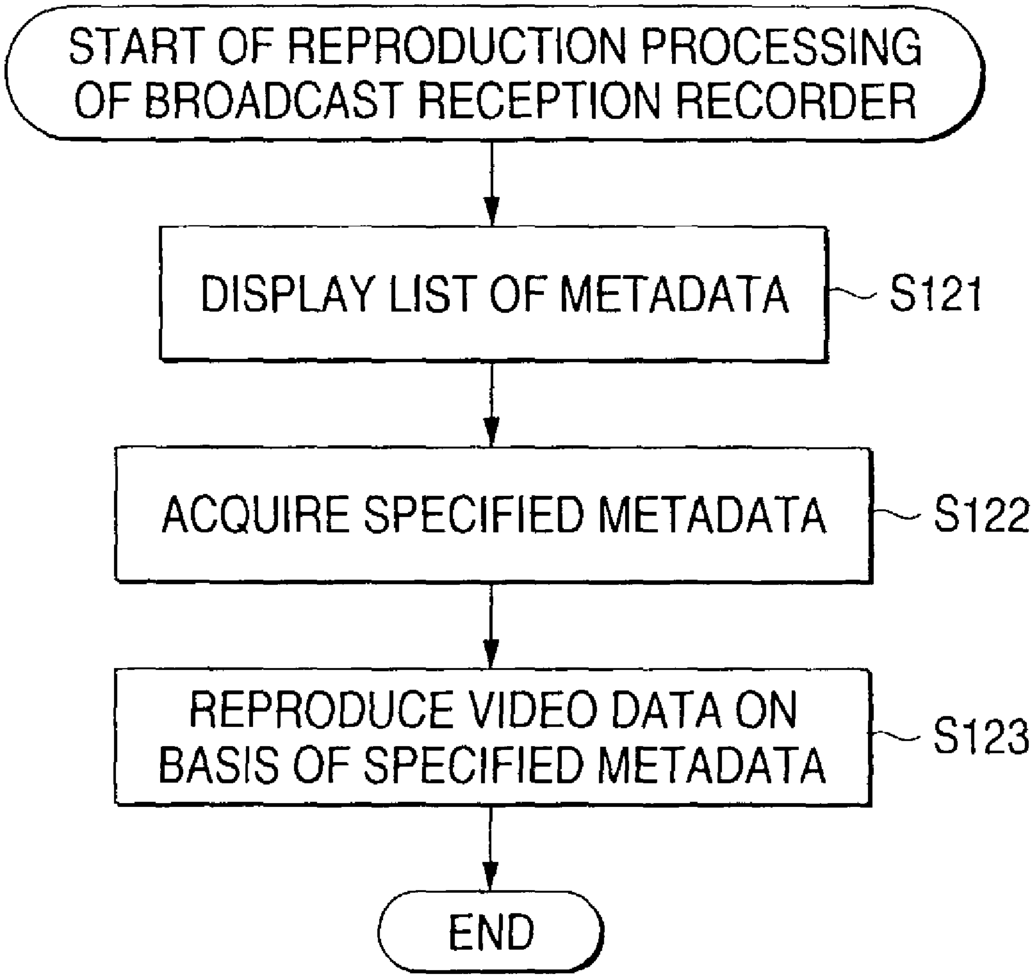
FIG. 13 is a flowchart for explaining a reproduction process of the broadcast reception recorder of FIG. 3.

The user having received the meta-data in the manner described above can reproduce the content using the meta-data. FIG. 13 shows a processing example in this case.

First, at step S121, when an instruction to display the list of meta-data is given through the input part 86, the CPU 80 controls the hard disk drive 85 through the hard disk drive controller 84, reads out the list of the meta-data recorded therein, outputs it to the monitor 77 through the composer 76, and causes it to be displayed. The user specifies a desired piece of meta-data from the displayed meta-data by operating the input part 86. At step S122, the CPU 80 identifies the meta-data specified by the user on the basis of the operation signal from the input part 86, and reads out the meta-data from the hard disk drive 85. Then, at step S123, on the basis of the meta-data acquired at step S122, the CPU 80 causes the video data stored in the hard disk drive 85 to be reproduced.

By this, for example, in the case where reproduction based on the meta-data as shown in FIG. 12 is instructed, for example, when scanning of the index is instructed through the input part 86, the CPU 80 causes a jump to the position of 15 minutes and 00 seconds specified in the block 251, and causes reproduction from that position. By this, the advertisement information recorded in the portion 113 of FIG. 4B is read out and is displayed on the monitor 77. Next, when the user operates the input part 86 to give an instruction to scan to a next index position, the CPU 80 causes the reproduction position to jump to the position of 5 minutes and 15 seconds. By this, the jump is made to the head position of the portion 112 of "Economic news" shown in FIG. 4B, and reproduction from that position is started.

Besides, in the case where the reproduction of the video story meta-data is instructed by operating the input part 86, the CPU 80 successively reproduces the respective segments in the order of seq=0, 1, 2 specified in the block 203 of FIG. 12. By this, first, the portion 113 shown in FIG. 4B is reproduced, next, the portion 111 is reproduced, and next, the portion 112 is reproduced.

In this way, although the user of the broadcast reception recorder 3-1 generates, as shown in FIG. 5, meta-data not containing the advertisement information of the portion 113 shown in FIG. 4B, in the case where the user of the broadcast reception recorder 3-2 receives the meta-data through the server 2, the information of the portion 113 is added. Accordingly, the advertisement information is reproduced without fail.

Figure 14:
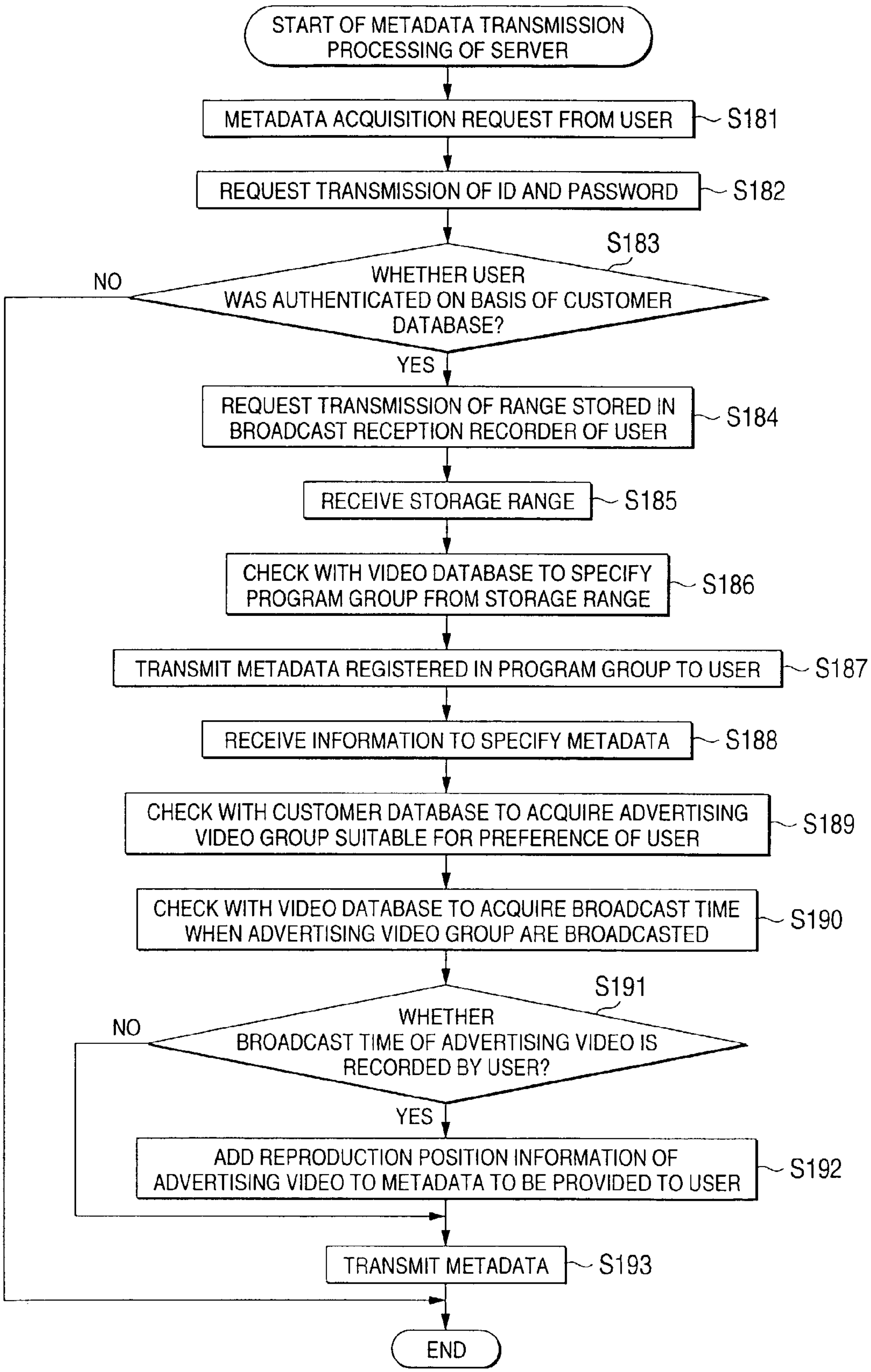
FIG. 14 is a flowchart for explaining another meta-data transmission process of the server of FIG. 2.

In the above, although the advertising video added to the meta-data is specified on the basis of the advertising video contained in the content corresponding to the meta-data, it is also possible to add an advertising video suitable to the preference of the user. FIG. 14 shows a processing example of the server 2 where a request for meta-data transmission is received from the broadcast reception recorder 3 in this case.

Processings from step S181 to step S188 are similar to the processings from step S81 to step S88 of FIG. 10.

That is, when the transmission of the meta-data is requested from the user of the broadcast reception recorder 3, an authentication process is performed, and in the case where a correct authentication result is obtained, the content stored in the broadcast reception recorder 3 is searched. Then, the meta-data corresponding to the searched content is selected, and transmission of a designated piece of meta-data among the meta-data is requested from the user of the broadcast reception recorder 3.

At this time, at step S189, the CPU 31 reads out the preference information of the user of the broadcast reception recorder 3 registered in the customer database 11, and acquires advertising videos suitable to the preference. For example, in the case where the user likes sports, advertising videos concerning sports are acquired, and in the case where the user likes an automobile, advertising videos concerning the automobile are acquired.

Further, at step S190, the CPU 31 searches the video database 12 and acquires a broadcast time when the advertising video acquired by the processing of step S189 is broadcast. At step S191, the CPU 31 determines whether the broadcast reception recorder 3 stores the content relating to the broadcast time acquired by the process of step S190 from the information of the storage range received by the process of step S185. In the case where the content containing the broadcast time is stored, at step S192, the CPU 31 executes a process to add the advertising video acquired by the process of step S189 to the reproduction position of the meta-data. In the case where the content relating to the broadcast time acquired by the process of step S190 is not stored, the process of step S192 is skipped.

Thereafter, at step S193, a meta-data transmission process is executed.

As stated above, in this example, since advertisement information suitable for the preference of the user is provided, for example, it becomes possible for the operator of the server 2 to collect a fee from more sponsors.

Although the foregoing series of processes can be executed by hardware, they can be executed through software. In the case where the series of processes are executed through software, a program constituting the software is incorporated in dedicated hardware of a computer, or is installed in, for example, a general-purpose personal computer which can execute various functions by installation of various programs from a network or a recording medium.

As shown in FIG. 2, this recording medium is constituted by not only a packaged medium which is distributed to provide a program to a user separately from an apparatus body, such as the magnetic disk 51 (including a floppy disk), the optical disk 52 (including a CD-ROM (Compact Disk-Read Only Memory) and a DVD (Digital Versatile Disk)), in each of which the program is recorded, the magneto-optical disk 53 (including an MD (Mini-Disk)), or the semiconductor memory 54, but also by the ROM 32 which is provided to the user in the state where it is previously incorporated in the apparatus body and in which the program is recorded, the hard disk included in the memory part 38, or the like.

Incidentally, in the present specification, the program recorded in the recording medium may include processing performed in time series in the recited sequence, and also processing which is not necessarily executed in time series but is executed in parallel or individually.

Incidentally, in the present specification, the term "system" indicates the whole apparatus constituted by a plurality of units.

As described above, according to the present invention, since the second information is changed and output so that the third information is reproduced in addition to the first information, the third information is certainly presented, and the first information can be used more effectively and secondarily.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus, comprising:

a holding unit operable to hold second information to define a reproduction section and a reproduction order of first information;

a change unit operable to change the second information held in the holding unit so that third information is reproduced in addition to the first information; and an output unit operable to output the second information changed by the change unit;

wherein the first information is transmitted content, the second information is meta-data, and the third information is advertisement information.

2. An information processing apparatus according to claim 1, further comprising:

a reception unit operable to receive a request for output of the second information from another information processing apparatus through a network; and a judgment unit operable to determine whether the another information processing apparatus holds the first information defined by the second information the output of which is requested by the another information processing apparatus, wherein, when the judgment unit determines that the another information processing apparatus holds the first information, the output unit outputs the second information to the another information processing apparatus through the network.

3. An information processing apparatus according to claim 2, wherein the judgment unit further determines whether the another information processing apparatus holds the third information, and when it is determined that the another information processing apparatus does not hold the third information, the judgment unit further determines whether the another information processing apparatus holds third information corresponding to different first information.

4. An information processing apparatus according to claim 3, wherein, when the judgment unit determines that the another information processing apparatus holds the third information together with the first information, the output unit outputs the second information to the another information processing apparatus.

5. An information processing apparatus according to claim 2, further comprising an acquisition unit operable to acquire the second information through the network, wherein the holding unit holds the second information acquired by the acquisition unit.

6. An information processing apparatus according to claim 1, further comprising:

a detection unit operable to detect a preference of a user of the another information processing apparatus; and a searching unit operable to search the third information corresponding to the preference detected by the detection unit, wherein the change unit changes the second information so that the third information searched by the searching unit is reproduced.

7. An information processing method, comprising:

holding second information to define a reproduction section and a reproduction order of first information;

changing the second information so that third information is reproduced in addition to the first information; and outputting the changed second information;

wherein the first information is transmitted content, the second information is meta-data, and the third information is advertisement information.

* * * * *